United States Patent Office 3,346,660
Patented Oct. 10, 1967

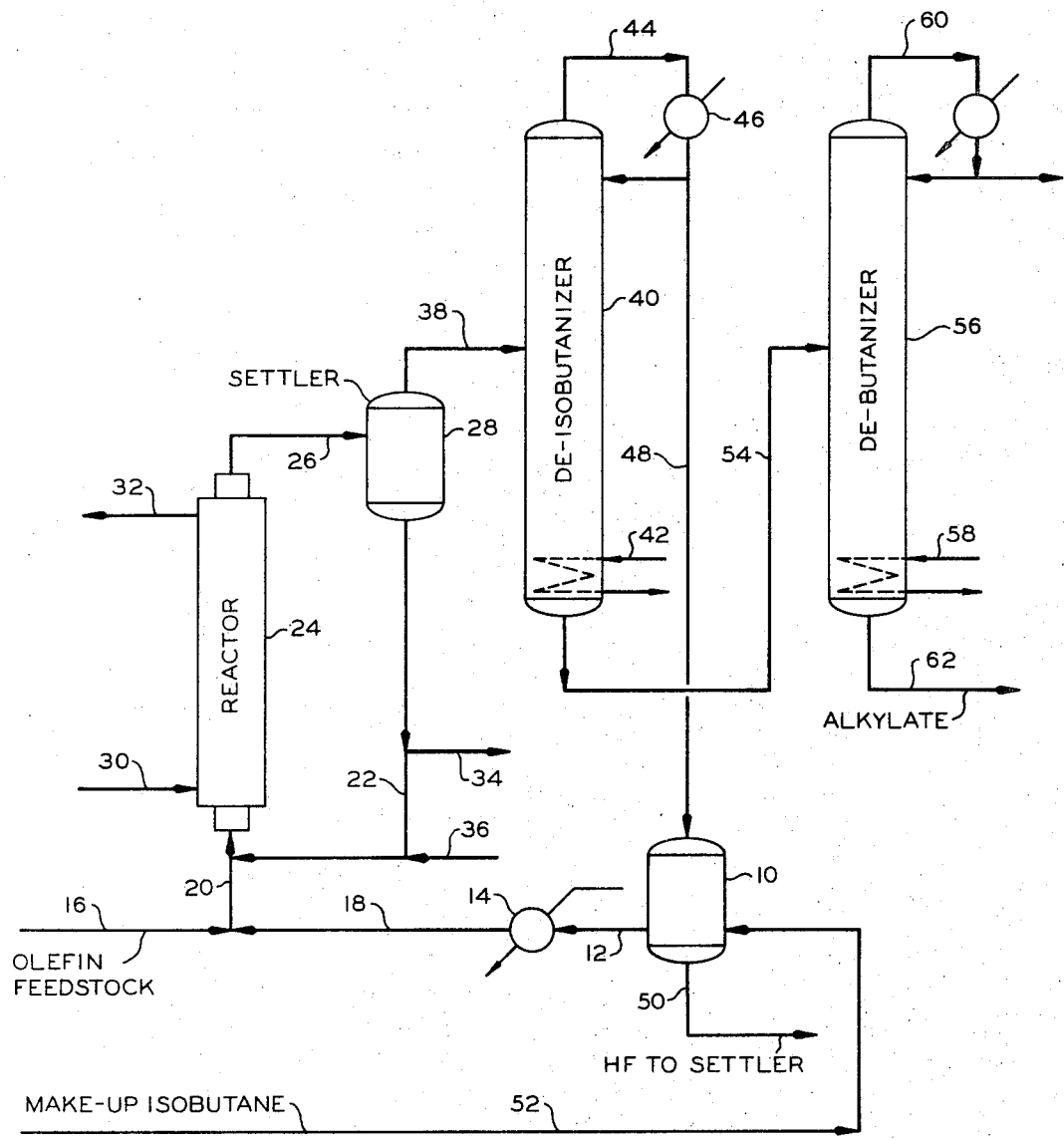

3,346,660
ALKYLATION PROCESS WITH PRECOOLED ISO-
PARAFFIN AND HF ACID CATALYST
Thomas Hutson, Jr., and Cecil O. Carter, Bartlesville,
Okla., assignors to Phillips Petroleum Company, a corporation of Delaware
Filed Sept. 20, 1965, Ser. No. 488,401
1 Claim. (Cl. 260—683.49)

ABSTRACT OF THE DISCLOSURE

Alkylate having increased octane value is obtained by utilizing an isoparaffin feedstock precooled to a temperature of about 35° F. and an HF acid catalyst precooled to a temperature of about 89° F. and the resulting mixture of isobutane, HF acid catalyst and olefin feedstock having a temperature of about 89° F. in a reactor zone having an effluent temperature of about 95° F.

---

This invention relates to an improved method for the alkylation of an isoparaffin with an olefin in the presence of an acid catalyst. In one aspect it relates to an alkylation of hydrocarbons wherein the refrigeration requirements normally required due to the exothermic nature of the reaction is significantly reduced, while at the same time the octane value of the reaction product is raised by precooling the isoparaffin stream prior to the utilization of the same in the reactor.

In the alkylation of organic compounds as in the alkylation of an excess of an alkylatable compound or hydrocarbon, e.g., an isoparaffin, a naphthene or an aromatic, with an alkylating compound such as an olefin or an olefin yielding compound, in the presence of a catalyst such as hydrofluoric, sulfuric and other acids, the reaction is exothermic and best or optimum results are obtained at controlled temperatures which are maintained by refrigeration or cooling to obtain a suitable cooling without interfering with the attainment of optimum results both in terms of efficiency of operation and quality of product. This has been a continuing problem facing those skilled in the art. As a result, various methods or operations have set forth, each in its own way seeking to completely provide the optimum operation. While it is not possible to state that any one of the several methods set forth in the art is the best, it is possible to state that there is room for improvement, especially in the economics and efficiencies of heat transfer, as well as in the cost and general arrangement of apparatus required to accomplish an improved alkylation.

It is thus the object of the present invention to provide an improved method for the operation of an alkylation system.

Another object of this invention is to provide a method for obtaining alkylates having high octane values while at the same time reducing signficantly the refrigeration requirements over that previously practiced in the art.

Other aspects, objects and the several advantages of this invention will be apparent to those skilled in the art from this description, the drawing and the appended claim.

In accordance with the present invention, I have discovered that by cooling the isoparaffin stream and thereafter mixing same with the olefinic material prior to the contacting of same with the acid catalyst there is obtained not only an increase in the octane value of the resulting alkylate but, in addition, there is avoided the necessity of significantly cooling the acid catalyst prior to recycling same to the reaction system. Since the acid phase is generally present in a quantity 4 to 5 times greater than that of the isoparaffin or olefin, it becomes immediately apparent that by avoiding the necessity of having to significantly reduce the acid phase temperature there is provided an alkylation system which represents a substantial savings in the operation of the process due to the substantial reduction in the cost of refrigeration which would be otherwise required.

In terms of the specific embodiment in connection with which this invention is now more fully described, by reducing the temperature of the isobutane feed stream to within the range of 30–40° F. and thereafter mixing therein the olefinic alkylating compound and thereafter contacting same with the HF acid catalyst which has been reduced only slightly below the reactor effluent temperature (about 5° F.) and thereafter carrying out the alkylation reaction in otherwise conventional apparatus which are generally provided with temperature control means, there is achieved as a production of the reaction an alklate material having improvd octane value in comparison to that obtained by the conventional procedures and, in addition, there is avoided the necessity of having to refrigerate the acid catalyst more than can be conveniently obtained by means of water cooling.

In order to more clearly illustrate the invention and to provide a better understanding thereof, reference is made to the attached drawing which is a diagrammatic illustration of the process of the invention.

Isobutane feed is obtained from isobutane storage tank 10 by means of conduit 12. The isobutane is chilled in heat exchanger 14 to a temperature of about 35° F. Olefin feed stock composed essentially of butylene and propylene is introduced by means of conduit 16 to the chilled isobutane in conduit 18. Thereafter the mixture of isobutane and olefin in conduit 20 is contacted with HF acid catalyst which is introduced into conduit 20 by means of conduit 22 which communicates with acid settler 28. If desired, a heat exchanger can be employed in conduit 22 to reduce the HF temperature to about 89° F. However, this expedient is not required where the recycle acid has cooled sufficiently or is cooled sufficiently when mixing with the isobutane-olefin mixture so as to have a resulting temperature below the desired alkylation temperature. The combined streams of isobutane, olefin and HF acid catalyst prior to being introduced to the reactor 24 should be at a temperature of about 82.7° F. However, the temperature can be below this point without affecting the system. The total reaction mixture is then introduced by means of conduit 20 into reactor 24 which is a conventional water cooled alkylation reactor. The cooling medium is introduced to the reactor jacket by means of conduit 30 and subsequently removed therefrom by means of conduit 32. In this reactor, there is accomplished an exothermic alkylation reaction in which isobutane is alklated with the olefin. There is also formed normal butane in addition to that which is ordinarily contained in minor quantity in the isobutane stream. Still further, there is formed propane. Reactor effluent is passed by means of conduit 26 to settling zone 28 wherein the acid is settled from the hydrocarbon oil from where it is removed for recycle to the system by means of conduit 22. Contaminated acid containing polymers and other impurities can be withdrawn by means of conduit 34 for processing and reconcentrating for use again in the alkylation system, in which case it is returned to the system along with any other make-up acid by means of conduit 36.

The alkylate from settler 28 is passed by means of conduit 38 to deisobutanizer 40 which is provided with a reboiler 42 connected in conventional manner with the lower section of the column and supplied with heat by indirect heat exchange. The overhead from deisobutanizer 40 containing isobutane and some HF catalyst is removed by means of conduit 44, cooled in heat exchanger 46 and passed by means of conduit 48 to isobutane storage tank 10. Any HF acid catalyst carried over settles out of storage tank 10 and is removed by conduit 50. Make-up isobutane is provided to tank 10 by means of conduit 52.

Bottoms containing the desired alkylate are passed by means of conduit 54 to debutanizer 56 having a reboiler 58 connected with the lower section as in column 40, n-butane is removed overhead by means of conduit 60 and the desired alkylate is obtained as bottoms by means of conduit 62.

The following example is presented to further illustrate the invention.

Isobutane at a temperature of 35° F. is mixed with olefin feedstock. The resulting mixture is then mixed with HF catalyst to obtain a final temperature of about 82.7° F. at the reactor inlet. The cooling of the exothermic reactor is accomplished by passing a cooling medium around same in indirect heat exchanger. In this example only pre-cooling as required of the HF acid from its temperature when removed from the reactor, i.e., 95° F., to a temperature of 89° F. is made. While this example is based upon the utilization of pure feedstocks, it is intended and contemplated, as would be expected by one skilled in the art, that the invention is applicable to and similar results will be obtained when applied to conventional commercial alkylation feedstocks.

Among the advantages of operating according to the specific example as compared to prior art methods is that we refrigerate only the isobutane stream, thus avoiding the necessity of having to cool the recycle HF acid stream. In addition, there is achieved an increase in the octane rating of the alkylate as compared with that produced according to conventional alkylation procedures.

*Specific example*

| | |
|---|---|
| Olefin feed 16 | g.p.h.  0.41 |
| Fresh isobutane 52 | g.p.h.  0.57 |
| Recycle isobutane 48 | g.p.h.  4.85 |
| Isobutane charge 18 | g.p.h.  5.41 |
| Temperature | ° F.  35 |
| Catalyst charge 22 | g.p.h.  23.3 |
| Temperature | ° F.  89 |
| Reactor charge 20: | |
| Isobutane | g.p.h.  5.41 |
| Olefin | g.p.h.  0.42 |
| Catalyst | g.p.h.  23.3 |
| (Pressure to maintain liquid phase) | |
| Reactor effluent 26: | |
| Temperature | ° F.  95 |
| Deisobutanizer 40: | |
| Pressure | p.s.i.g.  103 |
| Charge 38 | g.p.h.  5.83 |
| Overhead 48 | g.p.h.  4.85 |
| Kettle bottoms 54 | g.p.h.  0.83 |
| Debutanizer: | |
| Charge 54 | g.p.h.  0.83 |
| Overhead 60 | g.p.h.  0.09 |
| Kettle bottoms 62 | g.p.h.  0.74 |

The following results were obtained by conducting a comparative run wherein the entire reactor charge was precooled.

| | Base Test | Invention |
|---|---|---|
| | Isobutane at 66° F. | Isobutane at 35-40° F. |
| Reactor Conditions: | | |
| Residence time, sec | 30 | 30 |
| Isobutane/olefin, vol. ratio | 13.0 | 12.4 |
| HF/hydrocarbon, vol. ratio | 4.0 | 3.98 (4.0) |
| Reactor outlet temp., ° F | 95 | 95 |
| Hydrocarbon inlet temp., ° F | 66.5 | 35.8 |
| Alkylate Properties: | | |
| Research octane No. (+3 cc. lead tetraethyl) | 106.6 | 108.9 |
| Motor octane No. (+3 cc. lead tetraethyl) | 108.0 | 109.3 |
| API gravity | 70.6 | 70.4 |
| ASTM Dist. end point, ° F | 386 | 360 |
| Yields: | | |
| Alkylate/olefin, vol | 1.80 | 1.75 |
| Isobutane consumed/olefin, vol | 1.17 | 1.11 |
| Alkylate/A.S.O., wt | 208 | 751 |

The above data clearly demonstrate that a significant octane increase is obtained by employing in the alkylation reaction a precooled isoparaffin.

Reasonable variations and modifications are possible within the scope of this disclosure without departing from the spirit and scope of the invention.

We claim:

A process for increasing the octane value of the effluent from an alkylation reaction zone which comprises alkylating isobutane with an olefin feedstock consisting essentially of butylene and propylene in the presence of an HF acid catalyst in an alkylation zone wherein said isobutane is precooled to a temperature of 35° F. and said HF acid catalyst is precooled to a temperature of about 89° F. and the resulting mixture of isobutane, HF acid catalyst and olefin feedstock having a temperature of about 89° F., an isobutane:olefin ratio of about 12.4 and an HF catalyst:olefin ratio of about 3.98 is introduced to said alkylation zone, recovering alkylation effluent having a temperature of about 95° F. from said alkylation zone, separating said HF acid catalyst therefrom and thereafter recovering the improved isobutane:olefin alkylate as a product of the process.

References Cited

UNITED STATES PATENTS

| | | | |
|---|---|---|---|
| 2,664,452 | 12/1953 | Putney | 260—683.58 |
| 3,121,126 | 2/1964 | Goldsby et al. | 260—683.62 |
| 3,155,742 | 11/1964 | Holzman et al. | 260—683.58 X |
| 3,168,591 | 2/1965 | Beavon et al. | 260—683.58 X |

DELBERT E. GANTZ, *Primary Examiner.*

R. SHUBERT, G. CRASANAKIS, *Assistant Examiners.*